O. O. ERFURTH.
CLAY PURIFIER.
APPLICATION FILED OCT. 16, 1915.
1,204,261.
Patented Nov. 7, 1916.
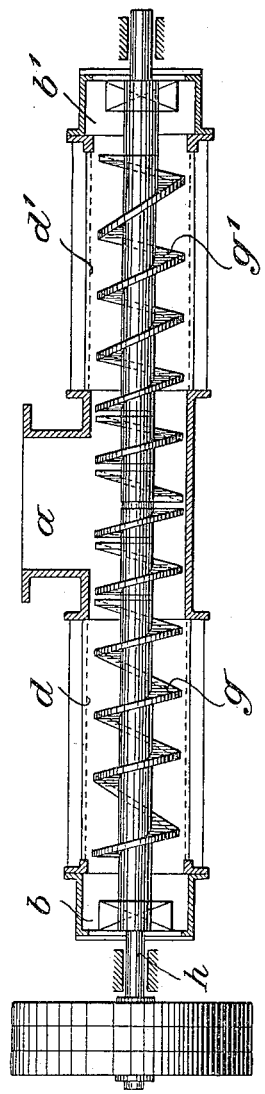
Inventor
Ottomar Oskar Erfurth
By Knight Bros
his Attorneys

UNITED STATES PATENT OFFICE.

OTTOMAR OSKAR ERFURTH, OF TEUCHERN, GERMANY.

CLAY-PURIFIER.

1,204,261. Specification of Letters Patent. Patented Nov. 7, 1916.

Application filed October 16, 1915. Serial No. 56,253.

*To all whom it may concern:*

Be it known that I, OTTOMAR OSKAR ERFURTH, a subject of the King of Prussia, and resident of Teuchern, in the Province of Saxony, Kingdom of Prussia, German Empire, have invented certain new and useful Improvements in or Relating to Clay-Purifiers, of which the following is a specification.

For the purpose of purifying clay and, more particularly in order to free it from stones and other admixed foreign bodies, use has been made hitherto of purifying apparatus comprising chiefly a sieve mantle and a worm rotating therein whereby the clay is pressed through the perforations in the sieve while the stones and other solid foreign bodies are separated and pass from the sieve at the end opposite the charging point. Since in apparatus of this kind the openings in the sieve are liable to become clogged and can only be cleaned after stopping the apparatus, it is obvious that such clay purifiers cannot be used in a continuous process but that the purified clay must, first of all, be collected in a separate chamber from which the working machines subsequently used are then charged for the further treatment of the clay.

In order that the clay may be conveyed from the purifier to the working machine without interruption it is necessary that the clay purifier should be capable of continuous working. To this end it has already been proposed to arrange on the mixing or charging cylinder two sieve cylinders movable or rotatable so that alternately the one or the other is brought in front of the outlet of the mixing cylinder and that the one may be cleaned while the other is working. This, however, is cumbersome and necessitates a stoppage of the driving gear when changing from one cylinder to the other.

According to the present invention the throwing out of action of the one sieve cylinder and the simultaneous throwing into action of the other may be effected solely by reversing the direction of rotation of the working worm. This reversal of the direction of rotation has at the same time the result that the cylinder which was previously operative is emptied entirely, or at least to such an extent that the sieve mantle may be thrown open and cleaned directly.

The drawing illustrates in longitudinal section a constructional example of the preferred form of a clay purifier according to my invention. The charging point $a$ is arranged in the center of the apparatus, and the boxes $b$, $b'$ adapted to receive the foreign bodies such as stones are arranged at each end.

The worm spindle or shaft $h$ carries within two co-axial cylindrical sieves $d$ and $d'$ the worms $g$ and $g'$ respectively. These coaxially arranged worms together form a conveyer unit which is the equivalent of and may be referred to as a single conveyer. The shaft $h$ is furthermore provided with any appropriate driving gear enabling the direction of its rotation to be reversed, if desired.

Assuming the rotation of the worms $g$, $g'$ to take place so that the impure clay supplied at $a$ is conveyed in the direction of the stone box $b$, it will be seen that the cylinder sieve $d'$ will be emptied and that the sieve $d$ resumes the stone sifting operation. Consequently, the cylinder $d'$ may be opened for cleaning purposes without interrupting the operation of the clay purifier. If, in the event of any clogging of the sieve perforations in the cylinder $d$, its efficiency should be impaired, it is only necessary to reverse the direction of rotation of the worms $g$, $g'$ whereby the contents of cylinder $d$ are conveyed into the cylinder $d'$ and the latter assumes the sifting operation.

The construction of my device may be modified by locating the boxes $b$, $b'$ in the center of the apparatus, in which case the impure clay would be charged in at both ends. In this instance when the direction of rotation of the conveyers is reversed, one cylinder will not empty itself into the other as in the preferred form of my device, but instead the clay will be conveyed back to the charging point of the cylinder to be emptied.

What I do claim as my invention and desire to secure by Letters Patent of the United States is:—

1. A clay purifier comprising in combination two cylindrical sieves, screw conveyers with equally directed pitch arranged coaxially within the cylindrical sieves, stone receiving boxes at one end, a charge box at the other end of each of the cylindrical sieves and driving gear by means of which the direction of rotation of the screw conveyers may be reversed, substantially as set forth.

2. A clay purifier comprising in combination two cylindrical sieves in co-axial arrangement, a charge box intermediate of and connecting the inner ends of the two cylindrical sieves, a stone receiving box at the outer end of each cylindrical sieve and two screw conveyers with equally directed pitch arranged co-axially within the cylindrical sieves and meeting within the said charging box, substantially as set forth.

3. A clay purifier comprising in combination two cylindrical sieves in co-axial arrangement, a charge box intermediate of and connecting the inner ends of the two cylindrical sieves, a stone receiving box at the outer end of each cylindrical sieve, two screw conveyers with equally directed pitch arranged co-axially within the cylindrical sieves and meeting within the said charge box, and a common shaft for the two screw conveyers with a driving gear enabling the rotation of the said conveyers to be reversed, all substantially as described and for the purpose specified.

4. In a clay purifier, in combination, a screw conveyer, a sieve associated with each end thereof for alternate use, means for admitting a charge to said conveyer at a point between said sieves, and a reversible drive for operating said conveyer in either direction whereby the charge is selectively delivered to the sieve toward which the conveyer is operated.

5. In a clay purifier, in combination a plurality of sieves for alternate use, conveyer means associated therewith, and means for reversibly operating said conveyer means to feed the material toward and away from said sieves respectively.

In testimony whereof I have hereunto set my hand in presence of two subscribing witnesses.

OTTOMAR OSKAR ERFURTH.

Witnesses:
RICHARD DREYHAUPT,
RUDOLPH FRICKE.

Copies of this patent may be obtained for five cents each, by addressing the "Commissioner of Patents, Washington, D. C."